United States Patent [19]

Kanter et al.

[11] Patent Number: 4,657,738

[45] Date of Patent: Apr. 14, 1987

[54] STACK GAS EMISSIONS CONTROL SYSTEM

[75] Inventors: Ira E. Kanter, Monroeville; Richard L. Hundstad, Forest Hills, both of Pa.

[73] Assignee: Westinghouse Electric Corp., Pittsburgh, Pa.

[21] Appl. No.: 857,508

[22] Filed: Apr. 21, 1986

Related U.S. Application Data

[63] Continuation of Ser. No. 605,348, Apr. 30, 1984, abandoned.

[51] Int. Cl.[4] .......................... B01J 19/08; B03C 3/40
[52] U.S. Cl. .......................... 422/186.04; 422/186.21; 422/186.23; 422/907; 204/272; 110/203; 110/210; 313/309; 313/351; 55/152; 55/DIG. 30
[58] Field of Search ............ 422/186.04, 186.18, 422/186.21, 186.23, 186.1, 907; 313/309, 336, 351, 304; 204/272, 259; 110/203, 210; 55/DIG. 30, 152

[56] References Cited

U.S. PATENT DOCUMENTS

| | | | |
|---|---|---|---|
| 832,767 | 10/1906 | Bridge | 422/186.18 X |
| 2,195,431 | 4/1940 | Shively et al. | 422/186.04 |
| 3,450,617 | 6/1969 | Hellund | 422/186.04 X |
| 3,653,185 | 4/1972 | Scott | 55/103 |
| 3,671,417 | 6/1972 | Louboutin | 422/186.18 |
| 3,706,182 | 12/1972 | Suraent | 422/186.21 X |
| 3,942,020 | 3/1976 | Ciambrone | 422/186.18 |
| 3,979,193 | 9/1976 | Sikich | 55/123 |
| 4,011,481 | 3/1977 | Preist | 313/304 |
| 4,198,282 | 4/1980 | Andreassen | 204/289 X |
| 4,507,266 | 3/1985 | Satoh | 204/176 X |

Primary Examiner—John F. Terapane
Assistant Examiner—Susan Wolffe
Attorney, Agent, or Firm—Thomas R. Trempus

[57] ABSTRACT

A system is described for use in the stack or flue ducts of a fossil fueled combustion system to eliminate or substantially reduce $SO_x$ and $NO_x$ emissions. The system includes an electrically operated stable glow discharge maintained between separate resistively ballasted pins and opposing plane electrodes. The electrochemical reactor of this invention electronically activates, reacts and chemically modifies the selected pollutants to render a thermodynamically stable solid product.

3 Claims, 8 Drawing Figures

STACK GAS EMISSIONS CONTROL SYSTEM

This application is a continuation of application Ser. No. 605,348, filed Apr. 30, 1984, now abandoned.

BACKGROUND OF THE INVENTION

1. Field of the Invention

The invention relates to a method and apparatus for controlling pollution. More specifically, the invention provides a technique wherein a combustion system exhaust gas flow including $SO_x$ and $NO_x$ emissions is reacted into a thermodynamically stable and less objectional product.

2. Description of the Prior Art

Several techniques are presently known for the control of airborne pollutants. Examples of these techniques include inertial separation, scrubbing, filtration, electrostatic precipitation, electron beam irradiation electro-photoionization and catalysis. Cyclone separators producing an abrupt change in direction of rapidly flowing gas streams effect separation of entrained solids by differences in the inertial forces acting on such solids as compared to the entraining gas. Cyclones have the advantage of simplicity of design, high capacity and easy maintenance. At best, however, such inertial separation devices are efficient only in extracting relatively large particles from the entraining gas and of course they are completely unable to separate contaminant gases present in the main body of gas or air being treated. Similarly, scrubbing or the reacting of a gas by contacting it with a fine spray of liquid such as water or chemical slurries has the advantage of relatively low equipment cost. But there are operational disadvantages with scrubbers, including handling of resultant slurry or sludge, the corrosion of equipment and microbiological growth problems. In most instances, such devices are limited in practice to the removal of relatively coarse particles from a gas, and any separation of gaseous pollutant $SO_2$ is dependent upon the relative solubilities of the pollutant and main gas components in water or other liquid. Catalytic beds are widely employed to treat various gaseous systems. Such beds are, however, very specific as to reactant and complementary catalyst, they require precise temperature control and they are extremely sensitive to poisons. Both gaseous species and particulates tend to poison the catalyst and cause reduced catalytic activity.

Electrostatic precipitation is widely used in applications and in spite of high initial equipment cost and operating expense, this system may represent the only practical procedure for obtaining acceptably low solid airborne particulate levels in gas or air streams exhausted to atmosphere. The procedure employed, of course, involves the application of high voltages to electrode arrays such that the gas near the electrodes is ionized and the particles suspended in the gas acquire a charge from contact with the gas ions. Such charged particles then migrate from contact with the gas ions. Such charged particles then migrate to an electrode of opposite charge and, as the gas flows over the electrode array, the charged particles attach themselves to the electrodes. Removal of the accumulated solid particles in most cases is accomplished by mechanically vibrating the electrodes to discharge the cakes of collected dust into a collection bin. Although the system is versatile and efficient in removing small solid particles from an atmosphere where the particle size is extremely small, it does have some important limitations, chief of which is the fact that only particulate matter can be precipitated. In addition, the physical and electrical characteristics of some particulate materials prevent them from being collected efficiently by an electrostatic precipitator. Electron beam irradiation systems have several major disadvantages including the use of high energy electrons ($>500$ KeV), the requirement for a fragile beam window to allow the beam into the gas duct and the need for an expensive electron beam accelerator external to the gas duct and the shielding required for protection from X-rays generated by the accelerator. Electrophotoionization effects the removal of contaminants through the combined action on the gas stream of a high intensity electrical field and electromagnetic radiation whereby the electrostatic precipitation of solid contaminants and the electrochemical and photochemical transformation of gaseous contaminants to elemental or non-contaminant form takes place. The field is induced by oppositely charged electrodes causing excitation of the particulate and gaseous contaminants to a state or condition causing dark current flow and/or glow discharge between the electrodes. Concurrently with such high voltage excitation, the gas stream is subjected to electromagnetic radiation in the ultraviolet range in order to produce photoionization which sustains the electrochemical and photochemical transformation. Presently, with the exception of the e-beam driven system, all of the aforedescribed systems will remove only one of the major gaseous $SO_2/NO_x$ species, with each process requiring serial operation.

It is an object of this invention to provide a system for the simultaneous removal of $NO_x$ and $SO_x$ constituents from a main stream of gas in a single process reactor.

It is another object of this invention to provide an emissions control system for large scale applications such as in fossil fuel combustion facilities and the like.

SUMMARY OF THE INVENTION

A system is described for use in the stack or flue ducts of a fossil fueled combustion system to eliminate or substantially reduce $SO_x$ and $NO_x$ emissions. The system includes an electrically operated stable glow discharge maintained between separate resistively ballasted pins and opposing plane or coaxially arranged electrodes. The electrochemical reactor of this invention electronically activates and chemically modifies the selected pollutants to render a thermodynamically stable solid product. This solid product can then be removed by standard available processes for particulate removal.

BRIEF DESCRIPTION OF THE DRAWINGS

The above as well as other features and advantages of the present invention will become apparent through consideration of the detailed description in connection with the accompanying drawings in which.

DESCRIPTION OF THE PREFERRED EMBODIMENT

Figure 1:
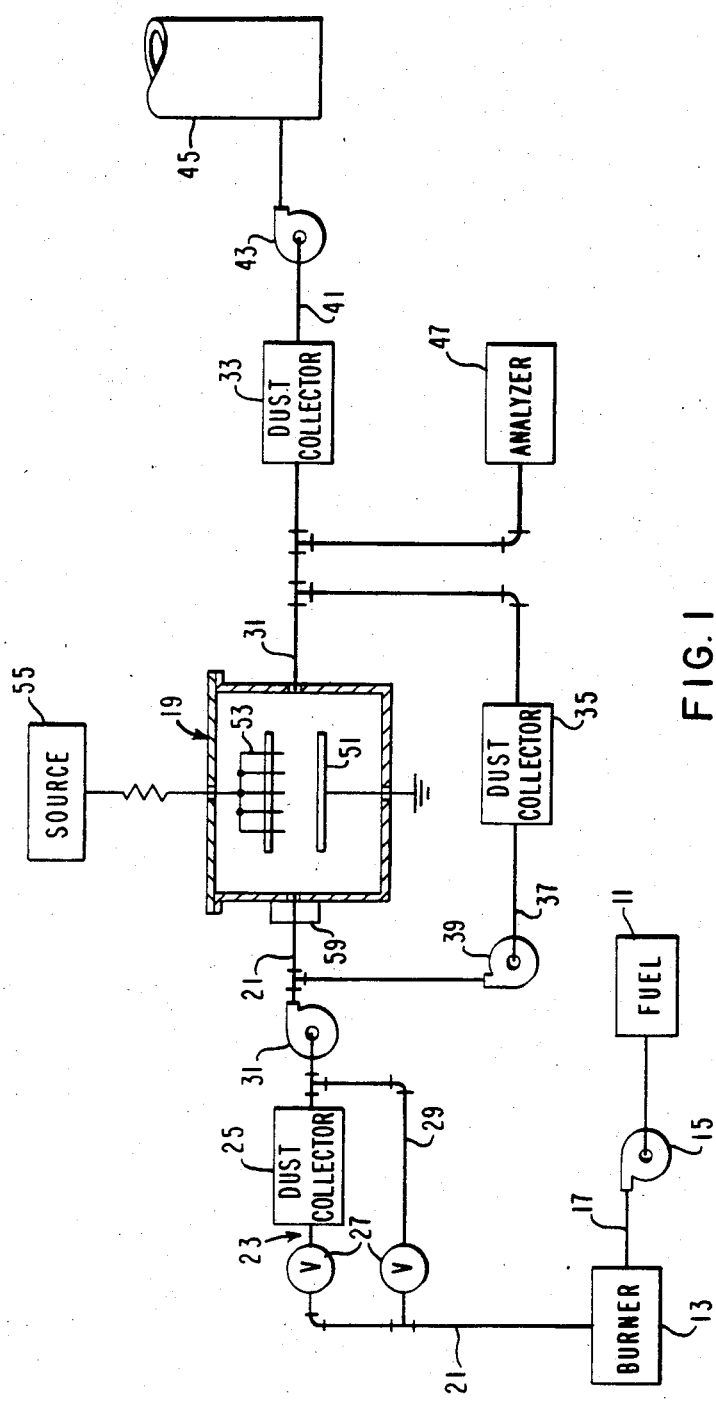
FIG. 1 is a schematical representation of an apparatus for the simultaneous removal of $NO_x$ and $SO_2$ constituents from stack gas emissions, all according to the teachings of this invention.

The application and general placement of a stack gas emissions control system according to this invention can be initially understood in the schematical representation of a gas flue duct network of FIG. 1. The invention is an electrically driven glow discharge system located in such a manner as to efficiently couple the energy of the electrons of the glow discharge systems with the gas stream to be detoxified. The electron energy average is 5 eV and therefore more closely matches the bond energies of simple chemical species. The flue gas stream flows through the glow discharge volume where electronically activated species are produced. The half life of these species may be in excess of 5 ms which for stream velocities in excess of 80 feet per second will increase the reaction volume beyond the actual physical dimensions of the glow discharge devices.

The apparatus which is schematically illustrated in FIG. 1 includes a fuel supply 11 which is introduced into a combustion device 13 by a pump means 15 through line 17. The combustion device 13 is a conventional burner of the type supplied with a fossil fuel fired electrical power generation plant or the like. Exhaust from the combustion device 13 is conveyed to an electrochemical reactor or a glow discharge system according to this invention and generally indicated by the reference character 19 by duct means 21. Typically, a first dust collector system 23 of conventional design is disposed between the glow discharge system 19 and the combustion device 13. The first dust collector system 23 includes a dust bag 25, control valves 27 and bypass duct 29. A fan means 31 is disposed along duct means 21 to assist in the operation of the dust collector system 23 and to maintain desired exhaust gas flow through the glow discharge system 19.

The operation of the glow discharge system 19 will be described in detail below. However, after the treatment of exhaust gas therein, the treated exhaust gas is conveyed through duct means 32 to one or more product particulate collector means 33 and 35. One of the particulate collector means 35 can be incorporated into a feedback loop through duct means 37 and blower means 39 in order to convey the treated exhaust gas back through the glow discharge system 19. The finally treated exhaust gas is conveyed through duct means 41 and blower means 43 into an exhaust stack 45 for discharge into the atmosphere. An $SO_2$ and/or $NO_x$ gas analyzer device 47 can be in communication with the exhaust duct means 32 as at 49 in order to monitor the output of treated exhaust gas from the glow discharge system 19.

The electrochemical reactor 19 includes spaced-apart electrodes 51, 53 which are disposed within the reactor with the circulating gas passing between an electrically grounded plane-like anode 51, and a cathode array of pin-like electrodes 53 which are preferably individually resistively ballasted external to the reactor and connected to a high voltage d.c. source 55. However, several pins, as illustrated can be configured to operate from a single ballast device. The number of pin-like electrodes 53 and their spacing in the array, as well as the applied potential and ballasting are determined to maintain a uniform glow discharge in the gas passing between the anode and cathode array along the path of travel of the air through the reactor. Preferably, the distance between each pin-like electrode and the plane like anode is substantially the same.

The typical chemical pollutant is electronically activated as a result of the glow discharge which is established in the flowing gas which includes the pollutant. The applied d.c. field across the electrodes serves to establish the glow discharge which produces activation of the permanent air components as well as the pollutant, which is then chemically modified or altered within the glow discharge reactor to render the pollutant harmless, or make it more easily separable by filtration.

The average energy of the electrons in the uniform glow discharge which is established between the electrodes is such that there is efficient electronic activation of the pollutant to promote the desired chemical change. The exhaust gas containing the pollutants is forced to flow through the glow discharge reactor at a flow rate such as to prevent formation of an arc between the electrodes, with the flow rate being generally in the range of from about 0.5-1 Mach number. The higher the velocity or flow rate of the exhaust gas, the higher the glow discharge current and power input without arc breakdown. The higher the power input, the greater the emissions control capability of the reactor. The gas pressure within the glow discharge reactor is at about atmospheric pressure or even slightly above. The resultant E/N for this condition ranges from 50 to 100 Td.

A means 59 for increasing the turbulence of the gas flowing into the glow discharge reactor can be included at the reactor inlet, such means as a screen or other increases the gas turbulence, thereby the glow discharge power input can be increased for more efficient electronic activation while avoiding arcing.

The electric field applied across the electrodes of the glow discharge reactor is such as to provide efficient electronic activation of the pollutant, with a typical field gradient of about 7-20 kV per centimeter, and generally greater than 1 kV per centimeter with the upper limit being the electric field gradient at which arcing occurs. This limit is dependent upon gas stream composition and velocity.

In general, the gas flow and electrical field parameters can be varied while maintaining operation in the glow discharge regime. This permits highly efficient power input to the glow discharge, and electronic activation which results in the simultaneous reduction or elimination of $NO_x$ and $SO_x$ in constituents from the exhaust gas.

Figure 2:
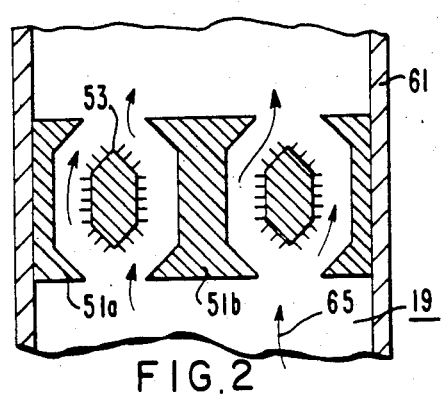
FIG. 2 is a somewhat schematical representation in elevation of the emission control device of this invention placed in the exhaust flow to be controlled.
Figure 3:
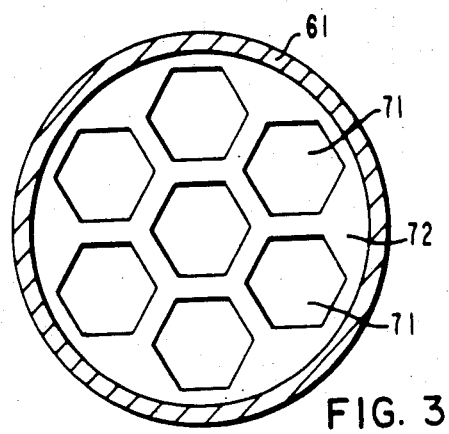
FIG. 3 is a schematical, plan view of an emission control device of this invention utilized in a modular embodiment.
Figure 4A:
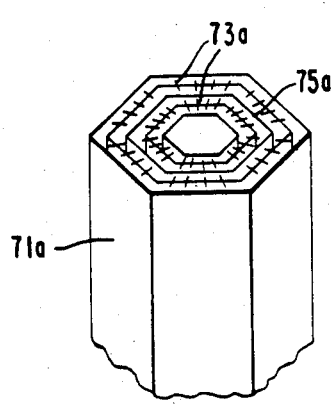
FIGS. 4A, 4B, 4C and 4D are somewhat schematical representations of exemplars of several modules which can be utilized in the emissions control device of FIG. 3, all according to the teachings of this invention.
Figure 4B:
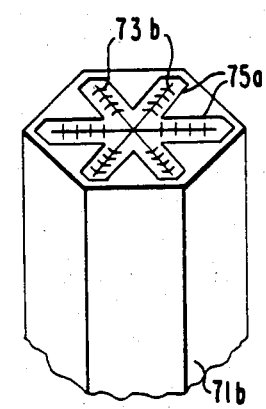
Figure 4C:
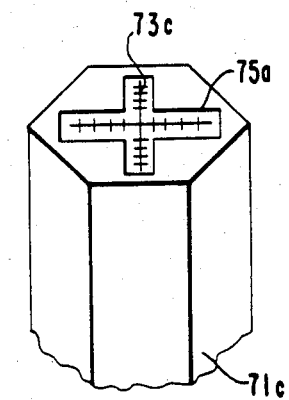

Considering FIG. 2, an arrangement of the electrodes 51 and 53 is illustrated whereby a stable glow discharge impressed between individually ballasted pins and planar opposing electrodes is sustained. The electrochemical reactor 19 is placed within the exhaust stack or the flue ducts where the exhaust gas is forced to enter the discharge volume at near atmospheric pressure and increased velocity. Increased velocity has been shown to increase the discharge current level prior to breakdown or arcing. The electrode shape and the physical disposition of electrodes relative to each other can be used to obtain increased velocity within the duct. The elevational view of FIG. 2 presents a preferred embodiment of the subject electrochemical reactor within a circular duct member 61. A first plane electrode 51a is circumferentially disposed about the inside wall of the duct member 61 and a second plane electrode 51b is centrally disposed within the duct member. Pin electrodes 53 are generally circumferentially disposed between plane electrodes 51a and 51b and a gas flow path is defined between the pin electrodes 53 and the plane electrodes 51a and 51b as shown by the arrows indicated by the reference character 65. It is to be appreciated that as shown in FIG. 3 the electrochemical reactor 19 can be configured as a plurality of individual modules 71 disposed in a supporting frame means 72 so that multiple module installations can be employed to properly reduce the emissions for various stack sizes and shapes. FIGS. 4A, B and C represent exemplars of pin electrode modules 71a, 71b and 71c respectively with unique configurations of the pin electrode placement as at 73a, 73b and 73c relative to the plane electrode 75a, 75b and 75c respectively. As indicated above, the disposition of the pin electrodes is one of the factors which contribute to the operational capability of the electrochemical reactor of this invention.

Figure 4D:
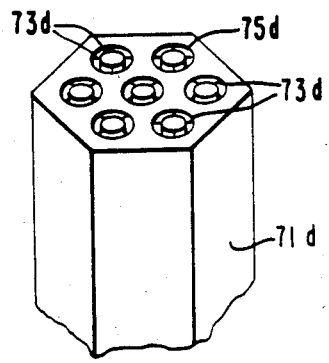

In the embodiment of FIG. 4D the reactor electrodes comprise a cylindrical anode 75d aligned along the direction of air flow with a cathode pin 73d extending to the longitudinal axis of the cylindrical anode as at the cylindrical anode inlet end. A plurality of ballasted cathode pins may be spaced apart along the length of the cylindrical anode, with each cathode pin terminating along the anode longitudinal axis. A plurality of nested cylindrical anodes may be provided with cathode pins associated with each anode along the respective cylindrical anode longitudinal axis.

Figure 5:
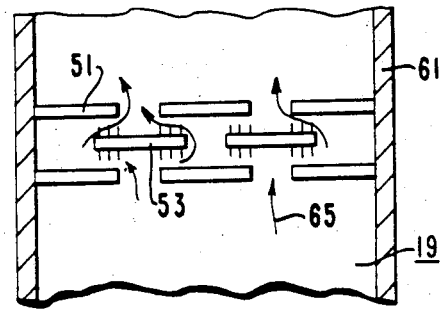
FIG. 5 is a somewhat schematical representation in elevation of an alternative embodiment of the emission control device of this invention placed in the exhaust flow of a combustion apparatus.

FIG. 5 shows an elevational view of a duct member within which is placed an alternative electrode configuration. The plane electrodes 51 are disposed on both sides of the pin electrodes 53, thus providing an exhaust gas flow path 65 in which substantial and prolonged contact within the glow discharge region of the electrodes is established. This alternative embodiment is also suitable for modular-type application as discussed above.

The stack gas emissions control system of this invention can be appreciated through a consideration of a theoretical description of the discharge physics and discharge chemistry kinetics which take place during pollutant control.

Numerical solutions were made to the Boltzmann equation to describe a glow discharge operating in air. The predictions for channeling of the electrical energy are as follows:
Vibrational excitation of $N_2$: 44%
Electronic excitation of $N_2$: 42%
Electronic excitation of $O_2$: 13%
Ionization: 0.25%
Other losses: 0.75%

This indicates that 55% of the electrical energy is channeled to produce electronically excited $N_2$ and $O_2$ which can produce free radicals such as O and N.

The minor components $SO_x$ and $NO_x$ can react within a discharge by primary electron interaction or by reactions or collisions with the major components. This latter path may provide higher yields of products involving $SO_x$ and $NO_x$, especially if chain reactions are controlling. For this reason, a simplistic approach was taken to arrive at a reaction mechanism. Reactions with free radicals could be considered with only those selected for which experimentally determined reaction rate constants were available. No chain reaction steps will be assumed. The kinetic mechanism is:

$$O_2^* \rightarrow 2O \tag{1}$$

$$O + 2O_2 \rightarrow O_3 + O_2 \tag{2}$$

$$O + O_3 \rightarrow 2O_2 \tag{3}$$

$$2O + O_2 \rightarrow 2O_2 \tag{4}$$

$$N_2^* \rightarrow 2N \tag{5}$$

$$N + O_2 \rightarrow O + NO \tag{6}$$

$$2NO + O_2 \rightarrow 2NO_2 \tag{7}$$

$$O + 2SO_2 \rightarrow SO_3 + SO_2 \tag{8}$$

$$SO_2^* + SO_2 \rightarrow SO_3 + SO \tag{9}$$

$$SO + SO_3 \rightarrow 2SO_2 \tag{10}$$

$$SO + O_3 \rightarrow SO_2 + O_2 \tag{11}$$

$$2NO_2 + O_3 \rightarrow N_2O_5 + O_2 \tag{12}$$

$$N_2O_5 + 2SO_3 \rightarrow (NO_2)_2S_2O_7 \tag{13}$$

$$2SO_2 + 3NO_2 \rightarrow (NO)_2S_2O_7 + NO \tag{14}$$

What has been described is a system which can be installed in the stack or flue gas ducts of a fossil fuel combustion system to eliminate or substantially reduce $SO_x$ and $NO_x$ pollutants in the exhaust gas. The system includes an electrically operated stable glow discharge maintained between separate resistively ballasted pins and an opposing plane.

What is claimed is:

1. A system for controlling $SO_x$ and $NO_x$ emissions of an exhaust gas flow generated by a combustion apparatus comprising: an electrochemical reactor in communication with said combustion apparatus so that the exhaust gas generated thereby circulates through said electrochemical reactor which includes an inlet and an outlet with the inlet coupled to a fan means whereby the exhaust gas from the combustion apparatus is circulated through said electrochemical reactor at a flow rate of from about 0.5 to 1 Mach number, which reactor includes a predetermined number of hexagonal modular units each comprising electronic cathode means spaced from anode means, each of which are disposed within said reactor to effect substantial contact with the exhaust gas circulated therethrough, said electronic cathode means comprising an array of spaced-apart pin-type cathode members spaced from a planar anode member, and means for providing a d.c. potential between said cathode means which are resistively balanced, and said anode means for establishing a uniform stable glow discharge current such as to provide efficient electronic activation of $SO_x$ and $NO_x$ whereby a field gradient of between about 7 to 20 kV per centimeter is established such that arcing does not occur and whereby the higher the velocity of flow rate of the exhaust gas through said electrochemical reactor, the higher the glow discharge current possible without arc breakdown in the exhaust gas wherein $SO_x$ and $NO_x$ are electronically activated or reacted to effect the chemical modification thereof, thus rendering a thermodynamically stable solid product, and filter means in communication with said electrochemical reactor outlet means for filtering the stable solid product from the electrochemically treated exhaust gas.

2. The system for controlling selected pollutants according to claim 1 wherein the pin-type cathode members which are resistively ballasted are connected to the high voltage d.c. source.

3. The system for controlling selected pollutants according to claim 2 wherein exhaust gas pressure and linear velocity, in addition to the flow rate, and the d.c. potential maintained between the cathode means and anode means are controlled to maintain a uniform stable glow discharge in the volume defined between the cathode means and anode means.

* * * * *